United States Patent
Smith et al.

(10) Patent No.: US 8,948,726 B2
(45) Date of Patent: Feb. 3, 2015

(54) DEVICE-BASED NETWORK SERVICE PROVISIONING

(75) Inventors: Christopher David Smith, Burlington (CA); David Kruis, Kitchener (CA); Robert V. N. Kline, Richmond Hill (CA)

(73) Assignee: BlackBerry Limited, Waterloo (CA)

( * ) Notice: Subject to any disclaimer, the term of this patent is extended or adjusted under 35 U.S.C. 154(b) by 270 days.

(21) Appl. No.: 12/648,411

(22) Filed: Dec. 29, 2009

(65) Prior Publication Data

US 2010/0167696 A1 Jul. 1, 2010

Related U.S. Application Data

(60) Provisional application No. 61/141,101, filed on Dec. 29, 2008.

(51) Int. Cl.
*H04W 4/00* (2009.01)
*H04W 8/18* (2009.01)
*H04W 8/24* (2009.01)

(52) U.S. Cl.
CPC .............. *H04W 8/183* (2013.01); *H04W 8/245* (2013.01)
USPC ..... 455/411; 455/419; 455/414.1; 455/412.1; 455/406; 455/413

(58) Field of Classification Search
CPC ....... H04W 4/00; H04W 12/00; H04W 12/06; H04W 12/12; H04W 8/24; H04W 8/26
USPC ................... 455/414.1, 419, 461, 432.3, 433, 455/410–411
See application file for complete search history.

(56) References Cited

U.S. PATENT DOCUMENTS

| 5,956,636 A | 9/1999 | Lipsit |
| 6,223,028 B1 | 4/2001 | Chang et al. |

(Continued)

FOREIGN PATENT DOCUMENTS

| EP | 1009175 A2 | 6/2000 |
| EP | 1482702 A1 | 12/2004 |

(Continued)

OTHER PUBLICATIONS

European Examination Report dated Oct. 27, 2011 issued by the European Patent Office relating to European Patent application No. 09 180 835.2.

(Continued)

*Primary Examiner* — Kiet Doan
*Assistant Examiner* — Michael T Vu
(74) *Attorney, Agent, or Firm* — Gowling Lafleur Henderson LLP

(57) ABSTRACT

A device-based network service provisioning model is provided in which a wireless device facilitates a subscriber to provide provisioning information for activating carrier, value-added or other service provider services automatically. The model facilitates subscriber control while balancing service provider needs. Provisioning components may be provided to a device during a provisioning session to maintain service provider branding, look and feel and other control over a subscriber's experience. Provisioning components may be dynamically generated to capture current services, subscriber plans and particular device criteria. In one embodiment, service provider-side components define a service-oriented interface (e.g. Web services) for receiving a subscriber's provisioning information. Device-side components define an interface to request and receive the provisioning components and to provide provisioning information to the service-oriented interface. A gateway may be interposed between the device and service-oriented interface to provide the provisioning components to the wireless device and proxy provisioning session communications.

24 Claims, 5 Drawing Sheets

(56) References Cited

U.S. PATENT DOCUMENTS

| | | | |
|---|---|---|---|
| 6,487,403 B2* | 11/2002 | Carroll | 455/419 |
| 6,499,017 B1 | 12/2002 | Feibelman et al. | |
| 6,549,770 B1 | 4/2003 | Marran | |
| 6,628,934 B2* | 9/2003 | Rosenberg et al. | 455/411 |
| 6,647,260 B2 | 11/2003 | Dusse et al. | |
| 7,035,630 B2 | 4/2006 | Knowles | |
| 7,043,241 B1* | 5/2006 | Sladek et al. | 455/432.3 |
| 7,187,660 B2 | 3/2007 | Shell et al. | |
| 7,194,503 B2 | 3/2007 | Shell et al. | |
| 7,239,877 B2 | 7/2007 | Corneille et al. | |
| 7,260,382 B1 | 8/2007 | Lamb et al. | |
| 7,266,371 B1 | 9/2007 | Amin et al. | |
| 7,295,522 B2 | 11/2007 | Shell et al. | |
| 7,349,710 B2 | 3/2008 | Kaplan et al. | |
| 7,349,990 B2 | 3/2008 | Shell et al. | |
| 7,353,017 B2 | 4/2008 | Chen et al. | |
| 2002/0024536 A1* | 2/2002 | Kahan et al. | 345/745 |
| 2002/0187775 A1 | 12/2002 | Corrigan et al. | |
| 2003/0120765 A1* | 6/2003 | Radi et al. | 709/223 |
| 2004/0242209 A1* | 12/2004 | Kruis et al. | 455/414.1 |
| 2007/0178895 A1 | 8/2007 | Bot | |
| 2009/0061839 A1* | 3/2009 | Zimmerman et al. | 455/419 |
| 2009/0247124 A1* | 10/2009 | de Atley et al. | 455/410 |

FOREIGN PATENT DOCUMENTS

| | | |
|---|---|---|
| EP | 1675308 A1 | 6/2006 |
| EP | 1780981 A1 | 5/2007 |

OTHER PUBLICATIONS

Canadian Office Action dated Nov. 10, 2011 issued by the Canadian Intellectual Property Office relating to Canadian Patent application No. 2,689,247.

OMA Device Management, "Open Mobile Alliance Device Management Specification", http://en.wikipedia.org/wiki/OMA_Device_Management; published Jun. 2006; first downloaded Dec. 2008.

Extended European Search Report issued by the European Patent Office dated Mar. 25, 2010 for corresponding European Patent Application No. 09180835.2.

Canadian Official Action dated Oct. 23, 2013, issued by the Canadian Intellectual Property Office relating to Canadian Patent Application No. 2,689,247.

Canadian Official Action dated Oct. 23, 2014, issued by the Canadian Intellectual Property Office for Canadian Patent Application No. 2,689,247.

* cited by examiner

DEVICE-BASED NETWORK SERVICE PROVISIONING

CROSS-REFERENCE

This application claims the benefit of the prior filing of U.S. Provisional Patent Application No. 61/141,101 filed Dec. 29, 2008, the disclosure of which is incorporated herein by reference.

FIELD

The present relates generally to wireless communication networks and devices and, more particularly, to device-based network service provisioning to enable a wireless device for wireless services.

DESCRIPTION OF THE RELATED ART

Wireless communication devices such as mobile devices providing wireless communication services such as voice communication, data communication or both via a wireless communication network are increasingly prevalent in modern society. Such devices may also provide additional personal digital assistant (PDA) functions such as a calendar, alarm, contact lists, calculators, etc.

Wireless communication services are typically provided on a service contract basis where a subscriber (i.e. a wireless device user or someone on behalf of the ultimate user) enters a service contract with a wireless carrier to have primary wireless services provided to the subscriber's equipment: the wireless communication device. To enable such services, the carrier's wireless communication system is configured with subscriber data such as, but not limited to, subscriber name and billing information, wireless service plan, subscriber's equipment type, and any required information to identify the subscriber's equipment to facilitate wireless communication. The activity of configuring the wireless communication network with such information to enable services is sometimes referred to as network service provisioning. Configuring a wireless device with device enabling information is sometimes referred to as device provisioning.

In a competitive business environment such as the providing of wireless services, enrolling or signing-up subscribers is a major focus of carrier activities. Often one or more networks of re-sellers or contract agents are employed on behalf of the carrier to enroll customers. One aspect of the enrollment procedure is the obtaining of subscriber information by a customer service representative (CSR) of the carrier or re-seller typically operating in a retail store location. The CSR then provides the information to the carrier to activate the subscriber's account and enable the wireless services. The CSR may provide the information via a telephone interface to the carrier or electronically through a Web-based interface. However, some subscriber's prefer different approaches to obtaining wireless services and wish to perform aspects of the enrollment themselves.

As well, subscribers want different approaches to the way in which changes to service contracts may be made or additional services can be added. A CSR-centered approach which requires a trip to a retail location or a telephone call to a CSR can be annoying for some subscribers and is an expensive way of providing such services.

Accordingly, there is a resulting need for a method and apparatus that addresses one or more of these shortcomings.

BRIEF DESCRIPTION OF THE DRAWINGS

Embodiments will now be described by way of example with reference to attached figures, wherein.

DETAILED DESCRIPTION

Figure 1:
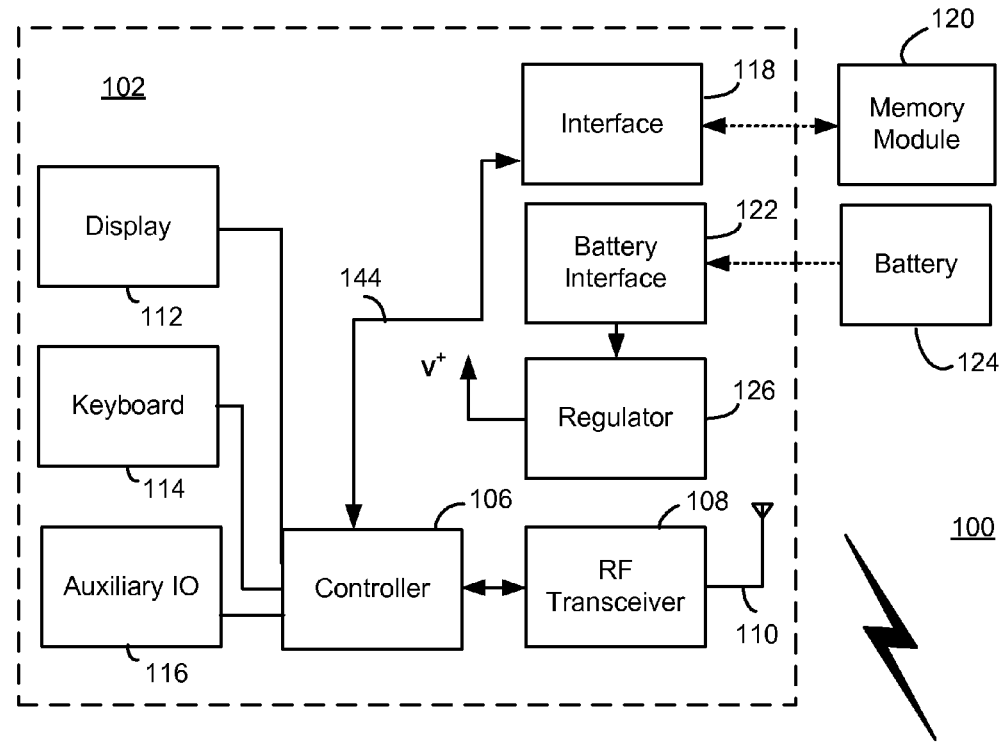
FIG. 1 is a block diagram which illustrates pertinent components of a wireless communication network and a mobile device which communicates within this network.
Figure 1:
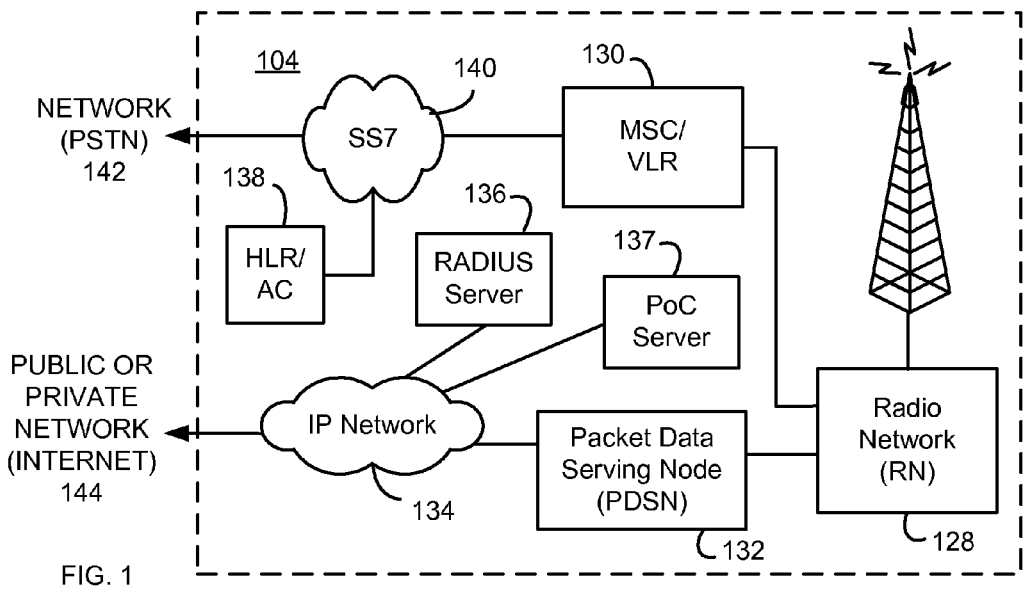

The present relates to device-based wireless service provisioning. Using a wireless device configured for network service provisioning a subscriber may provide subscriber information and request enablement of wireless services and a service provider (e.g. carrier or VASP) provisioning system adapted for device-based provisioning can receive the subscriber information to provision the wireless network to enable such services. Service amendments may also be requested and provisioned in a similar manner.

The device-based approach facilitates improved subscriber control while balancing service provider needs. Provisioning components of a wireless device interface may be defined and provided by (or on behalf of) a service provider during a provisioning session to permit the provider to maintain branding, look and feel and other control over a subscriber's experience. These provisioning components may be dynamically generated to capture current services and subscriber plans and to suit a particular wireless device. In one embodiment, service provider-side components define a service-oriented interface (e.g. Web services) for receiving a subscriber's provisioning information. Wireless device-side components define a mechanism to request and receive provisioning components to facilitate a subscriber to provide provisioning information to the service-oriented interface. A gateway may be interposed between the wireless device and service-oriented interface to provide the provisioning components to the wireless device and handle provisioning session communications between the wireless device and the service-oriented interface.

In one aspect, there is provided a method of provisioning a wireless device for services in a wireless communication network. The method comprises communicating via the wireless communication network to receive a provisioning profile from a service provider provisioning system configured for automatically provisioning services to wireless devices; generating a customized subscriber interface in accordance with the provisioning profile to receive provisioning information with which to define said services; receiving the provisioning information via the customized subscriber interface; communicating the provisioning information to the service provider provisioning system via the wireless communication network to activate the services for the wireless device; and receiving the services.

In another aspect there is described a wireless communication network for providing services to wireless devices. A plurality of wireless devices is configured for wireless communication via wireless communication network infrastructure, each wireless device comprising device-side components: defining an interface for requesting and receiving a provisioning profile via the wireless communication network infrastructure for provisioning services of a service provider; defining a run-time environment for generating a customized subscriber interface in accordance with the provisioning profile to receive provisioning information with which to define said services; and defining an interface for communicating the provisioning information via the wireless communication network infrastructure to a service provider provisioning system for automatically provisioning the services to the wireless device in accordance with the provisioning information. The service provider provisioning system is coupled via wireless communication network infrastructure for wireless communication with respective ones of the plurality of wireless devices. The service provider provisioning system comprises server-side components: defining an interface for receiving respective requests from the wireless devices and providing respective provisioning profiles in response; and defining an interface for receiving respective provisioning information from the wireless devices to automatically provision the services to the respective wireless.

In another aspect there is provided a service provider provisioning system for provisioning services to a plurality of wireless devices for communication via a wireless communication network, said system comprising server-side components defining an interface for receiving respective requests from the wireless devices and providing respective dynamically generated provisioning profiles in response, each provisioning profile configured for generating a customized subscriber interface by a run-time environment of the wireless devices to receive provisioning information with which to define said services; and defining an interface for receiving respective provisioning information from the wireless devices to automatically provision the services to the respective wireless devices.

Persons of ordinary skill in the art will recognize mobile device, method, computer program product and other aspects from the embodiments shown and described.

FIG. 1 is a block diagram of a communication system 100 which includes a mobile device 102 which communicates through a wireless communication network 104. Mobile device 102 preferably includes a visual display 112, a keyboard 114, and perhaps one or more auxiliary input/output (I/O) interfaces 116 (e.g. a track ball, a thumb wheel, a touch sensitive screen (which may be clickable) a GPS, one or more accelerometers, etc.), each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile device 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs.

Mobile device 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in the art that RF transceiver circuitry 108 will be adapted to particular wireless network or networks in which mobile device 102 is intended to operate.

Mobile device 102 includes a battery interface 122 for receiving one or more rechargeable batteries 124. Battery 124 provides electrical power to electrical circuitry in mobile device 102, and battery interface 122 provides for a mechanical and electrical connection for battery 124. Battery interface 122 is coupled to a regulator 126 which regulates power to the device. When mobile device 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile device 102 operates using a memory module 120, such as a Subscriber Identity Module (SIM) or a Removable User Identity Module (R-UIM), which is connected to or inserted in mobile device 102 at an interface 118. As an alternative to a SIM or an R-UIM, mobile device 102 may operate based on configuration data programmed by a service provider into an internal memory which is a non-volatile memory. Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 102 may be a multiple-module unit comprising a plurality of separate components, including but in no way limited to a computer or other device connected to a wireless modem. In particular, for example, in the mobile device block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary I/O interfaces 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile device 102 may have a more particular implementation as described later in relation to mobile device 202 of FIG. 2.

Mobile device 102 communicates in and through wireless communication network 104. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet). Wireless network 104 is exemplary and persons of ordinary skill in the art will appreciate that other wireless network architectures and standards may be used.

During operation, mobile device 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile devices within its cell. The base station transceiver system normally performs such functions as modulation and possibly encoding and/or encryption of signals to be transmitted to the mobile device in accordance with particular, usually predetermined, communication protocols and parameters, under control of its controller. The base station transceiver system similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile device 102. An RF channel is a limited resource that must be conserved, typically due to limits in overall bandwidth and a limited battery power of mobile device 102. Those skilled in the art will appreciate that a wireless network in actual practice may include hundreds of cells depending upon desired overall expanse of network coverage. All pertinent components may be connected by multiple switches and routers (not shown), controlled by multiple network controllers.

For all mobile devices 102 registered with a network operator, permanent data (such as mobile device 102 user's profile) as well as temporary data (such as a mobile device's 102 current location) are stored in a HLR/AC 138. In case of a voice call to mobile device 102, HLR/AC 138 is queried to determine the current location of mobile device 102. A Visitor Location Register (VLR) of MSC 130 is responsible for a group of location areas and stores the data of those mobile devices that are currently in its area of responsibility. This includes parts of the permanent mobile device data that have been transmitted from HLR/AC 138 to the VLR for faster access. However, the VLR of MSC 130 may also assign and store local data, such as temporary identifications. Mobile device 102 is also authenticated on system access by HLR/AC 138. In order to provide packet data services to mobile device 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile devices within network 104. A conventional PoC communication session involves a session connection between end users of mobile devices, referred to as session "participants", who communicate one at a time in a half-duplex manner much like conventional walkie-talkies or two-way radios.

Those skilled in the art will appreciate that wireless network 104 may be connected to other systems, possibly including other networks, not explicitly shown in FIG. 1. A network will normally be transmitting at the very least some sort of paging and system information on an ongoing basis, even if there is no actual packet data exchanged. Although the network consists of many parts, these parts all work together to result in certain behaviors at the wireless link. Though a CDMA wireless network 104 is described, network 104 may conform to any of the wireless network technologies and protocols including cellular, wide-area network, GSM, GPRS, CDMA, iDEN™, Mobitex™, etc.

Figure 2:
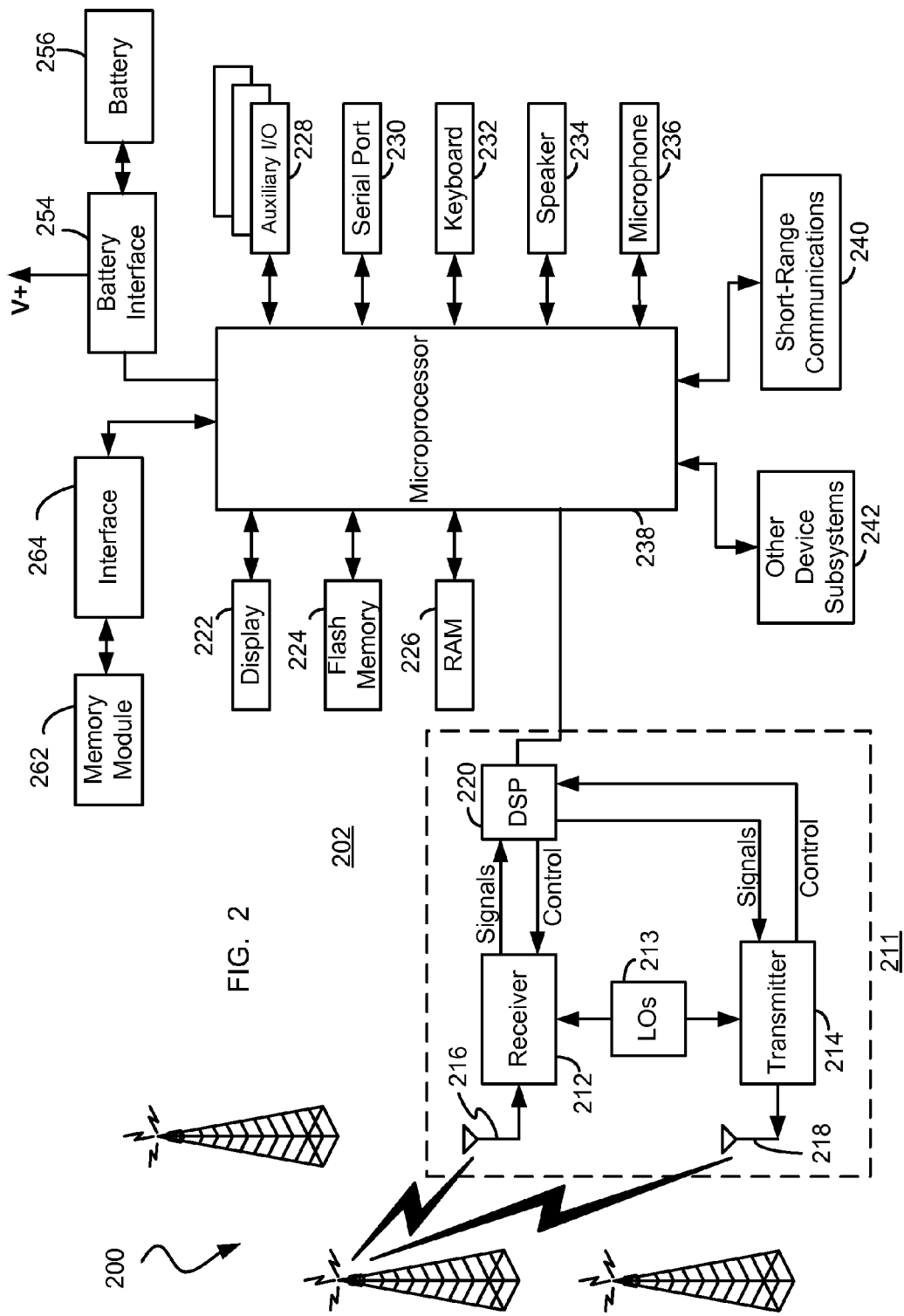
FIG. 2 is a detailed diagram of a mobile device which may communicate within the wireless communication network.

FIG. 2 is a detailed block diagram of a preferred mobile device 202. Mobile device 202 is preferably a two-way communication device having at least voice and advanced data communication capabilities, including the capability to communicate with other computer systems. Depending on the functionality provided by mobile device 202, it may be referred to as a data messaging device, a two-way pager, a cellular telephone with data messaging capabilities, a wireless Internet appliance, or a data communication device (with or without telephony capabilities). Mobile device 202 may communicate with any one of a plurality of base station transceiver systems 200 within its geographic coverage area.

Mobile device 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in the field of communications, particular design of communication subsystem 211 depends on the communication network in which mobile device 202 is intended to operate.

Mobile device 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile device 202, and therefore mobile device 202 comprises a memory module 262, such as a Subscriber Identity Module or "SIM" card or a Removable User Identity Module (R-UIM), to be inserted in or connected to an interface 264 of mobile device 202 in order to operate in the network. Alternatively, memory module 262 may be a non-volatile memory which is programmed with configuration data by a service provider so that mobile device 202 may operate in the network. Since mobile device 202 is a mobile battery-powered device, it also includes a battery interface 254 for receiving one or more (rechargeable batteries 256. Such a battery 256 provides electrical power to most if not all electrical circuitry in mobile device 202, and battery interface 254 provides for a mechanical and electrical connection for it. The battery interface 254 is coupled to a regulator (not shown in FIG. 2) which provides power V+ to all of the circuitry.

Mobile device 202 includes a microprocessor 238 (which is one implementation of controller 106 of FIG. 1) which controls overall operation of mobile device 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 202. A predetermined set of applications which control basic device operations, including at least data and voice communication applications, will normally be installed on mobile device 202 during its manufacture. A preferred application that may be loaded onto mobile device 202 may be a personal information manager (PIM) application having the ability to organize and manage data items relating to user such as, but not limited to, e-mail, calendar events, voice mails, appointments, and task items. Naturally, one or more memory stores are available on mobile device 202 and SIM 262 to facilitate storage of PIM data items and other information such as described further herein with reference to FIG. 14.

The PIM application preferably has the ability to send and receive data items via the wireless network. In a preferred embodiment, PIM data items are seamlessly integrated, synchronized, and updated via the wireless network, with the mobile device user's corresponding data items stored and/or associated with a host computer system (not shown) thereby creating a mirrored host computer on mobile device 202 with respect to such items. This is especially advantageous where the host computer system is the mobile device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or preferably a non-volatile store such as flash memory 224 for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or Web page download will be processed by communication subsystem 211 and input to microprocessor 238. Microprocessor 238 will preferably further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile device 202 is substantially similar, except that the received signals are output to speaker 234 and signals for transmission would be generated by microphone 236. Alternative voice or audio I/O subsystems, such as a voice message recording subsystem, may also be implemented on mobile device 202. Although voice or audio signal output is preferably accomplished primarily through speaker 234, display 222 may also be used to provide an indication of the identity of a calling party, duration of a voice call, or other voice call-related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication.

Short-range communications subsystem 240 of FIG. 2 is an additional optional component which provides for communication between mobile device 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment, mobile device 202 is a multi-tasking wireless communications device configured for sending and receiving data such as electronic mail, instant messages, SMS messages, and other data messages and for making and receiving voice calls. To provide a user-friendly environment to control the operation of mobile device 202, an operating system (not shown) resident on device 202 provides a user interface such as a graphical user interface (GUI) having a main screen and a plurality of sub-screens navigable from the main screen.

Figure 3:
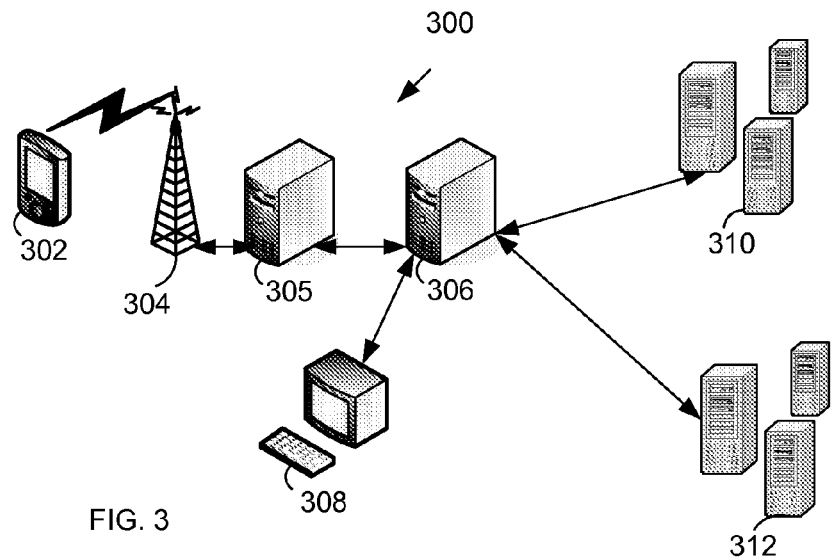
FIG. 3 is a block diagram of an embodiment of the wireless communication network adapted in accordance with device-based network service provisioning.

In accordance with an embodiment, device 202 and various network component(s) may be adapted to provide for device-based network service provisioning. FIG. 3 illustrates a block diagram of a wireless network system 300 in which components thereof are adapted. Wireless network system 300 comprises a wireless device 302, wireless network equipment 304, gateway 305, carrier provisioning system 306, provisioning configuration system 308, carrier billing and ERP system 310 and network service control system 312.

Device 302 may comprise a mobile device such as station 202 described with reference to FIG. 2. Device 302 comprises at least a minimal amount of logic (typically pre-provisioned software instructions and corresponding data) described further below, to initiate provisioning operations with carrier provisioning system 306 via gateway 305 such as upon a start-up of device 302 and upon establishing basic communication with wireless network equipment 304 symbolized by a base station.

Wireless network equipment 304 includes infrastructure such as radio network 128 and packet data serving node 132 providing gateway services to bridge wire line and wireless communication networks. Wireless network equipment 304 communicates (data) wirelessly with device 302 and over a wire line network (public or private) with other components, particularly gateway 305 to carrier provisioning system 306. A specific embodiment of a gateway 305 is described below with reference to FIG. 7.

Gateway 305 comprises a server for proxying communications between device 302 and services such as CPS 308. Gateway 305 may be physically located with CPS 308 (e.g. as carrier equipment) or separately located at another location such as when offered by a third party service provider.

Carrier provisioning system 306 comprises one or more servers coupled for communication with device 302. Carrier provisioning system 306 is further coupled for communication with carrier infrastructure such as a provisioning configuration system 308, billing and ERP system 310 and network service control system 312. Carrier provisioning system 306 is configured via software to provide provisioning profile information (e.g. in the form of a profile) to device 302 dynamically based on properties of device 302 and the current configuration of system 306 as determined by provisioning configuration system 308. A provisioning profile enables device 302 to present an interface to a subscriber to provide provisioning information to the carrier provisioning system.

Provisioning configuration system 308 comprises a computer system configured for creating provisioning profiles for providing to various types of subscriber equipment to enable such equipment to define provisioning information (e.g. selecting desired services and billing options and inputting subscriber information, etc.) in accordance with various services and service plans and contracts offered by a carrier. Provisioning profiles include instructions and data for configuring a subscriber's equipment and vary in accordance with the different types of subscriber equipment supported by a carrier. The profiles may also vary for other reasons. For example, a profile may be defined for a group of enterprise users and for a particular type of subscriber equipment. Such a profile may restrict the services offered to such equipment via a typical profile for this type of equipment or such a profile may direct the provisioning of certain services, reducing options, and pre-populating certain subscriber information, etc. The elements of the services offered may be tailored based on criteria.

Provisioning configuration system 308 provides the profiles (and/or instructions with which to generate the profiles) to carrier provisioning system 306 (e.g. by communicating with and configuring carrier provisioning system 306 accordingly) for providing in turn to subscriber equipment during network service provisioning operations. In one embodiment, the provisioning profile is hosted by the carrier provisioning system 306. In another, the provisioning profile is hosted by the provisioning configuration system 308. In such a scenario, an interface may be provide to the carrier provisioning system 306 to request the profile from the provisioning configuration system 308 as needed (e.g. in real-time in response to a provisioning session with a device).

During such provisioning operations, carrier provisioning system 306 receives provisioning information from subscriber equipment and, in accordance with business logic defined for the services to which a subscriber desires to subscribe and the plans offered etc., configures carrier infrastructure equipment such as billing and ERP system 310 and network service control system 312 to enroll a subscriber (or make requested and permitted changes) and initiate (or otherwise manage) network services for a subscriber. As persons of ordinary skill in the art will understand, ERP systems assist a business enterprise with its planning and organizing of business functions, helping companies manage sales, marketing, human resources, etc. to service subscribers, for example.

Figure 4:
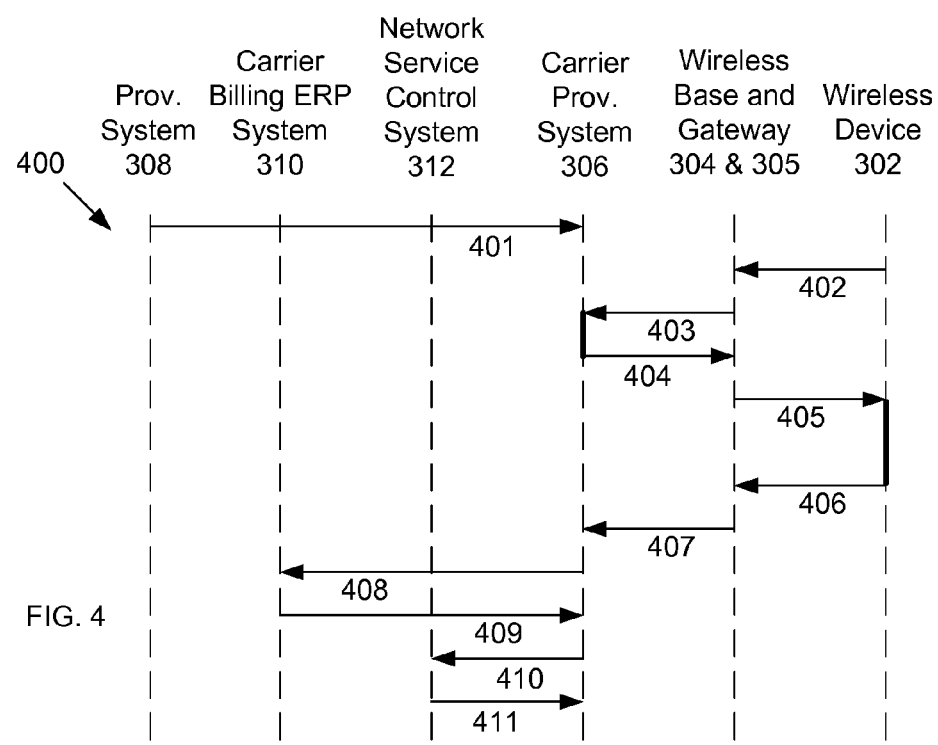
FIG. 4 is an illustration of message and operations flow of the embodiment of the wireless communication network adapted in accordance with device-based network service provisioning of FIG. 3.

FIG. 4 illustrates message and operational flow 400 between components of network 300 in accordance with an embodiment of network service provisioning operations. Flow 401 denotes the configuration of carrier provisioning system 306 by provisioning configuration system 308 with a provisioning profile compatible with subscriber device 302. Other profiles may also be provisioned. As noted, the provisioning profile comprises sufficient instructions and data for defining logic and a user interface to control device 302 and enable a provisioning session to provide provisioning information. Thereafter, carrier provisioning system 306 awaits initiation of a provisioning session by a device 302 of a suitable type and which is adapted to engage in a provisioning session.

In a new subscriber scenario for example, a subscriber (not shown) activates device 302 and initiates the provisioning session communicating over a preferably limited and controlled communication channel to carrier provisioning system 306 via base station 304 and gateway 305. In a new user equipment scenario, device 302 (e.g. SIM memory module 262 thereof) has not yet been provisioned for network services (e.g. voice and/or data communications). For example, device 302 has not been provisioned with service books for controlling particular operations of the device such as access to a service provider's voice and/or data communication network for cellular or other voice calling, Internet access, email, etc. In addition, device 302 may be configured to prevent the storage of such service books (e.g. until authorized). However, device 302 is sufficiently configured such as through a provisioning application stored to a memory device coupled to device 302 to communicate via base station 304 and gateway 305 to initiate a provisioning session. Flows 402 denotes the communication of a predetermined initiation provisioning packet from device 302 to gateway 305 and flow 403 denotes the routing of the packet from gateway 305 to carrier provisioning system 306. No other network traffic (service) is preferably allowed to be undertaken by device 302 at this point. The initiation packet preferably comprises information sufficient to identify the device type, operating system version and provisioning application version (as applicable) particularly when more than one type and respective version is supported, as well as source (e.g. PIN) and destination routing information, etc.

If a carrier does not support device-based network provisioning or carrier provisioning system 306 is temporarily unavailable, the initiation packet will not reach its intended destination or is otherwise ignored and the provisioning application on device 302 may go dormant. Network service provisioning may proceed in accordance with other approaches (not shown) or be re-tried.

In response to the initiation packet, carrier provisioning system 304 sends a provisioning profile to device 302 for use by the provisioning application. Communication of such is denoted by flows 404 and 405. Carrier provisioning system 304 may dynamically generate (denoted between flow 403, 404) a provisioning profile (e.g. a XML document) for the device 302 based on known properties of device 302 (e.g. display screen type, fonts, input/output devices etc.), provisioning application version and the current configuration of system 306 (i.e. services payment plans, etc.) which may be facilitated or assisted by provisioning configuration system 308. To enhance security features, a public key for encrypting communications during the provisioning session is also provided to device 302. As noted above, in an embodiment, the provisioning configuration system 308 may configure service on the carrier provisioning system (e.g. via Web service interface) and the provisioning system may host the provisioning profile (i.e. the document). In another embodiment, the carrier system may host the profile.

The provisioning application on device 302 accepts the profile and (denoted between flow 405-406) presents the subscriber with an interface generated therefrom to receive input to select services, plans etc. generating provisioning information. The entire user experience may be custom tailored using the profile, including carrier branding, how information is presented, requested, formatted, etc. If wireless communication coverage with a base station 304 is lost during a provisioning session, the provisioning application may be configured to operate in an out-of-coverage mode, communicating the provisioning information upon the resumption of coverage, if possible. Should coverage be lost for a particular length of time, it may be beneficial to require a re-initializing of the provisioning session to obtain a current profile.

Flows 406 and 407 denote the (encrypted) communication of provisioning information transactions to carrier provisioning system 306. While a single end-to-end flow is shown between device 302 and carrier provisioning system 306 for this purpose, more than one flow to carrier provisioning system 306 and from carrier provisioning system 306 may be involved. These transactions include service selection, payment options, personal information etc. as discussed and are transmitted securely (e.g. using Public Key Cryptography techniques).

Carrier provisioning system 306 interfaces with carrier infrastructure equipment 310 (e.g. via flows 408 and 409) and carrier infrastructure equipment 312 (e.g. flows 410 and 411) to complete service activation and billing set-up. Persons of ordinary skill in the art will appreciate that business logic associated with such flows may dictate that activation cannot be completed as desired by a subscriber. Transactions may be repeated to try again or a session ended without activation.

Figure 5:
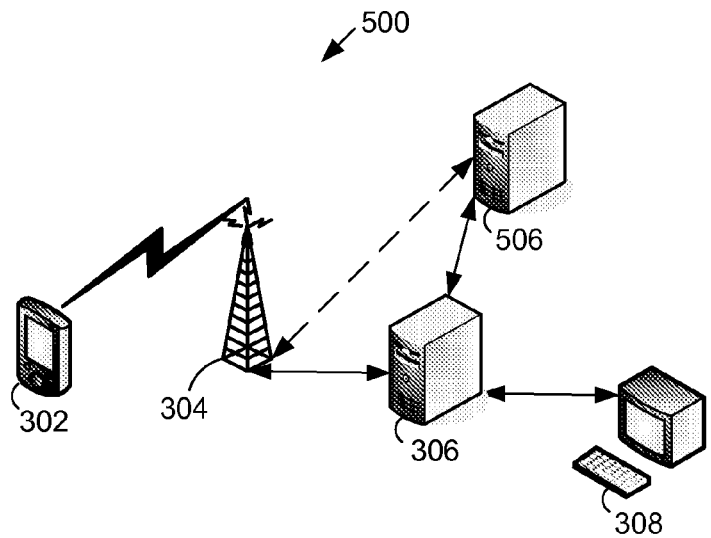
FIG. 5 is a block diagram of a second embodiment of a wireless communication network adapted in accordance with device-based network service provisioning.

FIG. 5 illustrates an embodiment 500 of network 300 adapted for device-based network service provisioning of value added services. Network 500 comprises subscriber's wireless device 302, base station and gateway 304, carrier provisioning system 306 and provisioning configuration system 308 as described earlier and further comprises value added service provider (VASP) provisioning system 506. A person of ordinary skill in the art will appreciate the additional components may be coupled to the network 500 such as VASP infrastructure (not shown) or carrier infrastructure 310 and 312 of FIG. 3.

In the present embodiment, subscriber's device 302 may be configured for providing VASP provisioning information to provision value added network services offered by a third party service provider for example. Such VASP services typically use or depend on basic network services offered by a carrier. Advantageously, the method and systems described herein permit a carrier to maintain control of the look and feel of the provisioning experience, if desired.

Figure 6:
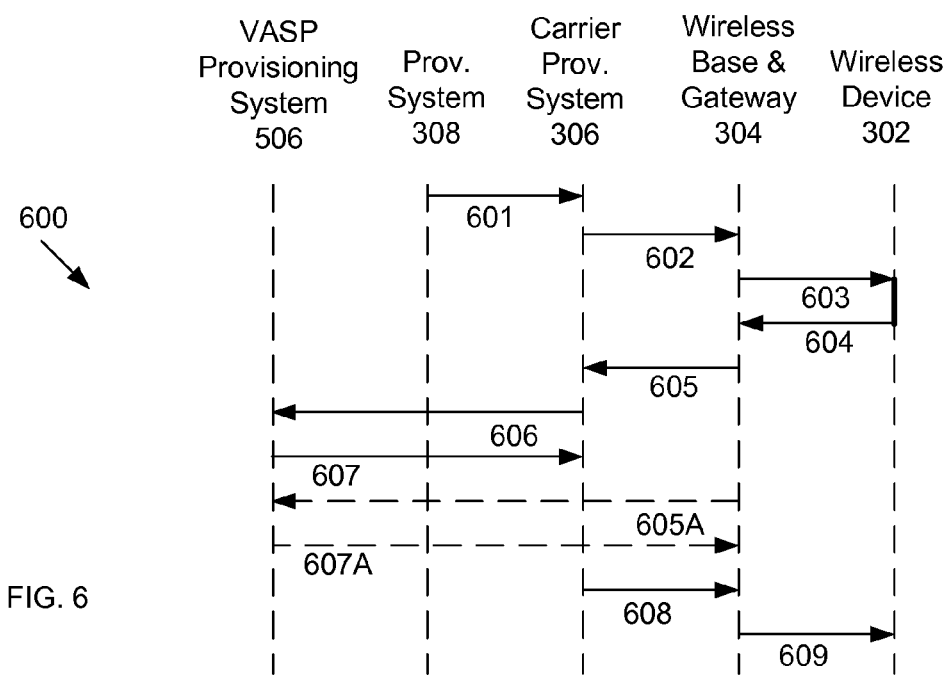
FIG. 6 is an illustration of message and operations flow of the embodiment of the wireless communication network adapted in accordance with device-based network service provisioning of FIG. 5.

FIG. 6 illustrates message and operational flow 600 between components of network 500 in accordance with an embodiment of VASP network service provisioning operations. Flow 601 denotes the configuration of carrier provisioning system 306 by provisioning configuration system 308 with a provisioning profile for VASP services compatible with subscriber device 302. Other profiles may also be provisioned. As described for carrier network provisioning, the provisioning profile comprises sufficient instructions and data for defining logic and a user interface to control device 302 and enable a provisioning session to provide VASP provisioning information. It will be appreciated that carrier and VASP provisioning profiles may be combined in a single profile or separated into two separate (or more) profiles. In a similar manner, a provisioning configuration system may facilitate or assist with the provision of a profile during a provisioning session for VASP services with a device 302.

Once the device 302 is activated on the carrier network, the device's provisioning application can be activated for VASP provisioning purposes by the subscriber or by and event initiated by the carrier. Flows 602 and 603 represent carrier initiated activation with the communication of a VASP provisioning profile to device 302.

One feature of VASP provisioning is how VASP provisioning transactions are communicated through network 500. A carrier can control via VASP provisioning profiles whether VASP provisioning can be accessed directly from device 302 communicating to VASP provisioning system 506 (as denoted by dashed line in FIG. 5) or through carrier provisioning system 306. for VASP provisioning transaction which flow through carrier provisioning system 306, this system 306 may communicate to a VASP provisioning system in accordance with Web Services protocols or other protocols for conducting service transactions electronically. Thus carrier provision system 306 may provide a front end device-based provisioning interface to device 306 and have a back-end interface to various VASP systems. Flows 604 and 605 represent transactions communicated to carrier provisioning system 306 using public key encryption techniques. The transactions may include changes to carrier network services or the addition of value added services to be routed to VASP provisioning system 506. Flow exchange 606 and 607 indicates back-end transactions facilitated by carrier provisioning system 306 with VASP provisioning system 506 on behalf of device 302. Flows 608 and 609 provide acknowledgement, if necessary, or additional device provisioning, if applicable in response.

Alternatively, for VASP provisioning profiles that enable direct communication to a VASP, flows 604, 605A, 607A and 609 denote VASP service transactions for direct communication between VASP provisioning system 506 and device 302 via gateway 305. Persons of ordinary skill in the art will appreciate that in this scenario, VASP provisioning server 506 supports a device-based provisioning interface. Such may be configured via a provisioning configuration system for VASP system 506 (not shown).

Though VASP provisioning is illustrated under at least partial control of a carrier (e.g. through the definition of and distribution of provisioning profiles and the restriction of particular channels of communication) persons of ordinary skill in the art will appreciate that VASP provisioning may be conducted in a similar manner to carrier provisioning discussed with reference to FIGS. 3 and 4. That is, a VASP provisioning system may be configured to provide provisioning profiles to a wireless device directly (i.e. independently) of carrier control. Provisioning profiles and the model may be used to provision initial network services as well as to add to or modify services as shown. It is also understood that VASP and carrier control may be reversed. A VASP could provide profiles to define an interface to a device and have a backend to a carrier provisioning service.

The above embodiments thus illustrate a device-based provisioning model for managing the provisioning requirements of services for a wireless data device directly on the device. The model is based on a set of standard interfaces implemented by the components and systems participating in the provisioning operations. Such interfaces comprise: (a) a device-side interface for receiving provisioning profile information from a service provider such as a carrier service provider or a VASP; (ii) device-side interface for translating provisioning profile information into a customized user interface (iii) device-side interface for sending provisioning information to a service provider (iv) service provider-side interface for creating and managing a provisioning profile; and, optionally, (v) service provider-side interface for communicating provisioning transactions between service providers when one service provider fronts another. The model may be configured to be device or service technology neutral, meaning a service provider may employ the model to provision multiple device types and for different services as long as the device types and service infrastructure support the standard interfaces.

Figure 7:
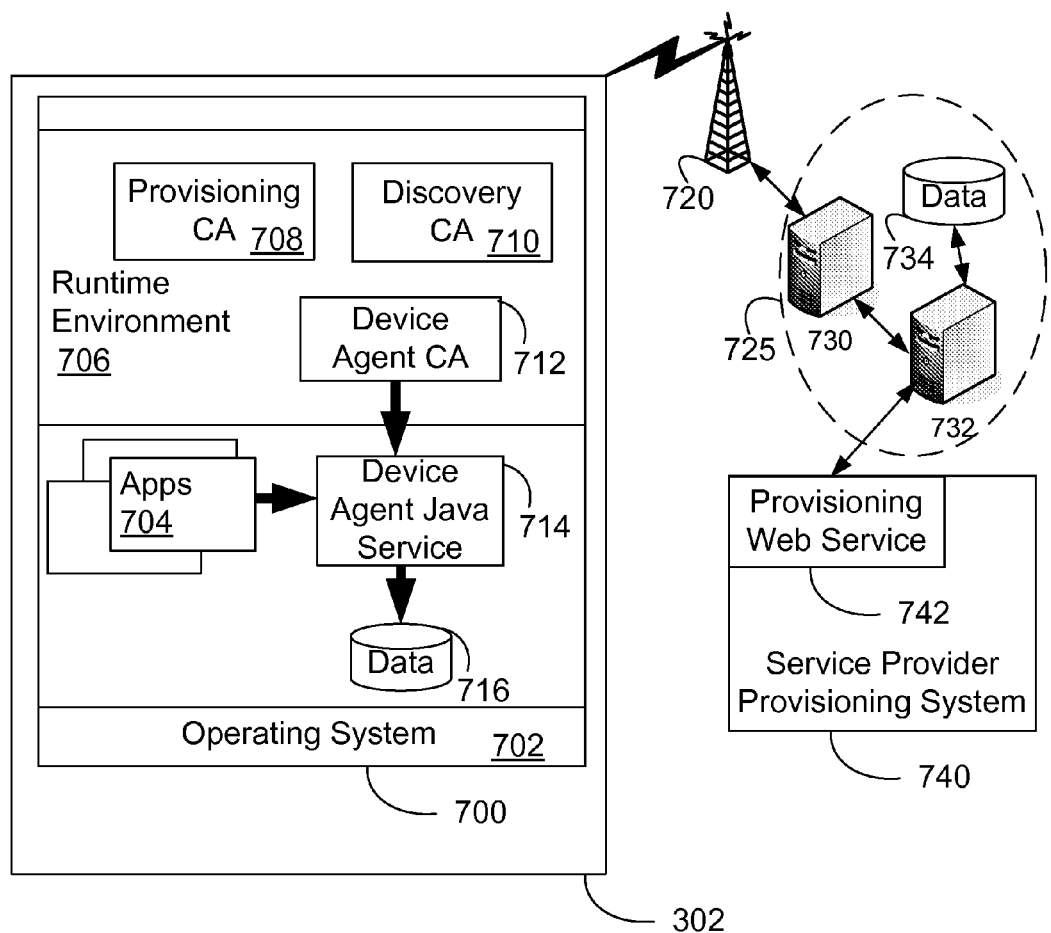
FIG. 7 is a block diagram of a further embodiment of a wireless communication network adapted in accordance with component application techniques to provide device-based network service provisioning.

FIG. 7 illustrates a communication network 700 comprising a component application-based embodiment for device-based network service provisioning of service provider equipment. Mobile device 302 is adapted via software to provide a component application framework to support component applications for, among other things, engaging in service-oriented communications within the wireless communication network as described further below. One or more component applications may be pre-loaded and enabled during a manufacturing/distribution step prior to delivery to a subscriber and be provisioned in accordance with over the air techniques. Advantageously, a pre-loaded and enabled (i.e. provisioned) component application may be useful for configuring device 302 for device-based network service provisioning.

Device 302 in FIG. 7 comprises a memory 700 for storing an operating system 702, applications (i.e. non-component based) 704, a container runtime environment 706 within which to run component applications such as a provisioning component application 708, a discovery component application 710 and a device agent component application 712 for provisioning services. Provisioning component application 708 may assist with the provisioning of component applications such as those discovered using discovery component application 710. Provisioning component application 708 may be configured to provide provisioning services for device agent component application 712. Service provisioning may be controlled using device agent component application 712.

The device agent component application 712 maybe configured such that its operation is transparent (invisible) to the end user and such that it has no end-user interface. The component application 712 is preferably installed as part of the runtime environment 706 during manufacturing exclusively for the purpose of receiving service profile data from the carrier or other service provisioning system 740. The device agent component application 712 may make use of a device agent Java service to communicate with other applications 704 on device 302. The device agent component application 712 as well as container environment 706 may be updated automatically (e.g. by system 740) based on the type of device 302, the version of the component application 712 and the O/S/runtime version such as at device 302 start-up and initial registration with system 740.

A device agent Java service 714 provides a set of APIs to the device applications (e.g. 704) to subscribe for notifications and update relevant device agent data (stored in a store 716). The Java service similarly provides APIs to the device agent component application 712 for purposes of updating device agent data and receiving notifications and system events. Store 716 is a secure repository of persistent data that exists within the device application environment. This store of data captures the device service profile data to be referenced, updated and accessed by applications on the device to turn features on or off and manage configuration.

Runtime environment 706 is a (subscriber equipment or client-resident) container within which component applications are executed on the device 302. The container manages the component application lifecycle on the device (provisioning, execution, deletion, etc.) and is responsible for translating data (e.g. XML) representing the component application into an efficient executable form on the device. The container 706 provides a set of services to the component application (incl. support for optional JavaScript). The container services include support for UI control, data persistence, asynchronous client-server messaging, etc.

A component application is an application defined generally by a structured set of components, including data components, message components, presentation components and workflow components. In some instances of a component application, one or more of these components (e.g. presentation component or workflow component) may not be present. A component application may comprise a data component and a message component, for example. The components are defined using a structured language and executed on a client device by an intelligent runtime container (e.g. environment 706).

Data components define data entities that are used by the component application program. Examples of data entities include orders, users, and financial transactions. Data components define what information is required to describe the data entities, and in what format the information is expressed. For example, the data component may define an order comprising a unique identifier for the order, which is formatted as a number; a list of items, which are formatted as strings; the time the order was created, which has a date-time format; the status of the order, which is formatted as a string; and a user who placed the order, which is formatted according to the definition of another one of the data components. Since data elements are usually transferred by a message or messages, there is often persistence of data components in a database. Data components may be dynamically generated or defined by the application designer.

Message components define the format of messages used by the component application program to communicate with external systems such as a Web service. For example, one of the message components may describe a message for placing an order, which includes a unique identifier for the order, a status of the order, and notes associated with the order.

Presentation components (sometimes called screen components) define the appearance and behaviour of the component application program as it displayed to a user via a user interface. The presentation components can specify graphical user interface (GUI) screens and controls and actions to be executed when the user interacts with the component application. For example, the presentation components may define screens, labels, edit boxes, buttons and menus, and actions to be taken when the user types in an edit box or pushes a button. Presentation components may be absent or minimal when the component application does not need to interact with a user.

Workflow components of the component application program define processing that occurs when an action is to be performed, such as an action specified by a presentation component as described above, or an action to be performed when messages arrive. Presentation workflow and message processing are defined by the workflow components. The workflow components are written as a series of instructions in either metadata or a programming language or a scripting language. The workflow component supports a correlation between message components and defines application flow as a set of rules for operations on other components.

More details regarding component application can be found in Patent Cooperation Treaty Application Numbers PCT/CA2003/001976 entitled, "System and Method for Building and Execution of Platform-Neutral Generic Services Client Applications" and published as WO2004059938; PCT/CA2003/001980 entitled, "System and Method of Building Wireless Component Applications" and published as WO2004059957; and PCT/CA2003/001981 entitled, "System and Method of Creating and Communicating with Component Based Wireless Applications" and published as WO2004059939, each of which is assigned to the owner of the present application.

Device 302 communicates within the wireless network via a base station 720 and through an application gateway system 725 (e.g. proxy 730, gateway 732 and component application data store 734). The application gateway system 725 mediates messaging between the client runtime on the device and a backend server (e.g. a web service). It transforms data messages to and from a wireless-friendly compact message format and provides the capability for truly asynchronous messaging. The gateway integrates and communicates with various backend systems such as a service provider provisioning system 740.

The application gateway system 725 comprises a component application provisioning server (not separately illustrated) that provides the infrastructure for optimized over-the-air provisioning of component applications on the subscriber equipment (e.g. 302), particularly those that have not been pre-loaded. The component application provisioning server is a component of the component application service and should not be confused with a service provider provisioning system (e.g. 740) to provision network services. The component application provisioning server interfaces to an application repository (e.g. data store 734) storing component application definitions which may be communicated to wireless devices.

The application gateway system 725 comprises a component application discovery server (not separately illustrated) that provides the infrastructure for optimized over-the-air discovery of component applications (i.e. component applications which may be provisioned after network services are enabled).

As such, network service provisioning components can be divided into three areas: device components, application gateway components and Web service components.

Device components deployed within the runtime environment 706 may include the component application 712 to implement the features of the service profile provisioning application, to obtain one or more profiles, as discussed above with reference to FIGS. 3-6. This component 712 may interact with the application infrastructure on the device to respond to system events, acknowledge and process messages originating from the application gateway and deliver notifications as necessary and generally in accordance with the flow and operations described with reference to FIGS. 4 and 6.

Network service provisioning may be implemented by the service provider in accordance with Web service techniques as such a service provider provisioning system 740 may include Web service components 742 for providing a service-oriented interface for provisioning. This service (schema) may be defined in accordance with standardized description language such as Web Service Description Language (WSDL).

The provisioning web service 742 residing within the provisioning system 740 is configured for the purpose of managing device service profile subscriptions. This Web Service may be configured to push down service profile data through the provisioning gateway system 725 to be received and processed by the Device Agent component application 712. The provisioning web service 742 will also receive acknowledgements and notifications from the Device Agent component application 712.

As discussed with reference to FIGS. 3-6, service provisioning may be accomplished by obtaining an storing an appropriate service book or profile. In the embodiment of FIG. 7, upon initial device registration, the provisioning system 740 selects the appropriate carrier profile and executes service provisioning and access control logic to determine the service profile of the individual subscriber. A device agent data message is constructed based on the subscriber's profile and delivered to the provisioning application gateway system 725 to be proxied to the Device Agent component application 712. The provisioning application gateway encrypts the message and sends it to the device 302 using the provisioning proxy. The device agent component application 712 receives the device agent data message and informs the device agent Java service 714. The device agent Java service persists the device agent data to store 716 and notifies all applications (704) subscribed to its listener interface.

Preferably, service profile delivery is acknowledged to service 742 (by device 302) upon successful persistence to store 716. An encrypted acknowledgement notification may be returned by component application 712 for receipt, decryption and forwarding by gateway system 725 to service 742. If delivery of the acknowledgement fails (for example device 302 goes out of coverage). The device agent data will maintain an unacknowledged state. A system event (radio on, PDP context, etc.) may be used to trigger delivery (e.g. retry) of any pending acknowledgement notifications.

A service profile on a device 302 may be updated, for example, to receive updates implemented by the service provider or in response to input from a subscriber using the device 302.

For service provider changes, according to one embodiment, a carrier (or other external actor) initiates a service change for one or more subscribers using APIs of the provisioning system 740 (e.g. via XML/SOAP/Web). A device agent data message is constructed, based on the subscribers profile, to incorporate a modification to the device agent data. The message is delivered to the provisioning application gateway system 725 to be proxied to the device agent component application 712. The provisioning application gateway encrypts the message and sends it to the device using the provisioning proxy. The device agent component application receives the device agent data message and informs the device agent Java service 714. Device agent Java service 714 persists (stores) the device agent data 716 modification and notifies all applications 704 subscribed to the listener interface. Similarly, an acknowledgement message is returned to the service provider provisioning system 740. If delivery of the acknowledgement fails (for example device goes out of coverage). The device agent data in store 716 will maintain an unacknowledged state. A system event (radio on, PDP context, etc.) may be used to trigger delivery of any pending acknowledgement notifications.

In accordance with one embodiment for providing a modification to services from the device to the service provider, applications 704 on the device use the device agent Java service 714 to alter the state of the device agent data 716, providing a device agent data notification message to be delivered to the Web Service to inform the service of the modification. The device agent Java service alerts the device agent component application 712 to send the notification back to the Web Service. The provisioning application gateway will decrypt the notification and proxy the modification data to the device agent Web Service on the provisioning system 740.

End-to-end security may be achieved by supporting encryption between the device 302 and application gateway system 725 and by allowing for a dedicated gateway 732 coupled with the provisioning Web Service which is only accessible through the gateway 732. The application gateway system 725 may deploy and host a dedicated 732 within secured infrastructure. The dedicated gateway 732 may be associated with a specific device agent component application 712. In this way the transmitted data has no exposure in its unencrypted form to an intermediary.

Persons of ordinary skill in the art will appreciate that the various network infrastructure components such as the gateway system 305, 725, the service provider provisioning system 306, 506, 740, and the provisioning configuration system 308 may be implemented using one or more computing systems such as one or more software configured desktops, laptops or servers.

Though illustrated as separate components with bright line distinctions, persons of ordinary skill in the art will appreciate that operations may be shared among various software components or overlapped and such component distinctions may be artificial.

The above-described embodiments of the present application are intended to be examples only. Those of skill in the art may effect alterations, modifications and variations to the particular embodiments without departing from the scope of the application. The subject matter described herein in the recited claims is intended to cover and embrace all suitable changes in technology.

What is claimed is:

1. A method of provisioning a wireless device for services via communication in a wireless communication network, the method comprising:
   receiving a provisioning profile at the wireless device from a service provider provisioning system configured for automatically provisioning services to wireless devices, the provisioning profile customized for the device;
   generating a customized subscriber interface at the wireless device in accordance with the customized provisioning profile, the customized subscriber interface configured to receive input with which to generate provisioning information for said services, wherein said input comprises subscriber information and the selection of said services to be provided;
   receiving the input to generate the provisioning information via the customized subscriber interface;
   communicating the provisioning information to the service provider provisioning system via the wireless communication network to activate the at least one selected service for the wireless device;
   receiving the at least one selected service; and
   generating a modification to at least some provisioning information for modifying the services in response to subscriber input and communicating the modification to the service provider provisioning system thereby to update the services.

2. The method of claim 1 comprising receiving via the wireless communication network and storing service provisioning data for authorizing said wireless device for said services.

3. The method of claim 2 comprising communicating via the wireless communication network an acknowledgment to the service provider provisioning system confirming said receiving and storing.

4. The method of claim 1 comprising receiving and storing a modification to at least some of the service provisioning data to modify the services, the modification generated in accordance with one or more updates by a service provider.

5. The method of claim 1 comprising, until said wireless device is provisioned for said services, restricting the wireless device from communicating via said wireless communication network other than for provisioning said services.

6. The method of claim 1 comprising receiving an encryption key in association with said provisioning profile and decrypting and encrypting communications for provisioning the wireless device.

7. The method of claim 1 wherein the wireless device is pre-configured to initiate the method of provisioning with a specific service provider.

8. The method of claim 1 comprising communicating with the service provider provisioning system via a network gateway configured to proxy communications between wireless devices and the service provider provisioning system.

9. A wireless device comprising:
   a communication sub-system for transmitting and receiving communications via a wireless communication network;
   a processor coupled to the communication sub-system; and
   a memory coupled to the processor, the memory storing instructions to configure the processor to communicate via the wireless communication network to:
   receive a provisioning profile at the wireless device from a service provider provisioning system configured for automatically provisioning services to wireless devices, the provisioning profile customized for the device;

generate a customized subscriber interface at the wireless device in accordance with the customized provisioning profile, the customized subscriber interface configured to receive input with which to generate provisioning information for said services, wherein said input comprises subscriber information and the selection of said services to be provided;

receive input to generate the provisioning information via the customized subscriber interface;

communicate the provisioning information to the service provider provisioning system via the wireless communication network to activate the at least one selected service for the wireless device; and receive the at least one selected service; and generate a modification to at least some provisioning information for modifying the services in response to subscriber input and communicating the modification to the service provider provisioning system thereby to update the services.

10. The wireless device of claim 9 wherein the instructions configure the processor to receive via the wireless communication network and store service provisioning data for authorizing said wireless device for said services.

11. The wireless device of claim 10 wherein the instructions configure the processor to communicate via the wireless communication network an acknowledgment to the service provider provisioning system confirming said receiving and storing.

12. The wireless device of claim 9 wherein the instructions configure the processor to generate a modification to at least some of the service provisioning data for modifying the services in response to subscriber input and communicate the modification via the wireless communication network to the service provider provisioning system thereby to update the services.

13. The wireless device of claim 9 wherein the instructions configure the processor to receive via the wireless communication network and store a modification to at least some of the service provisioning data to modify the services, the modification generated in accordance with one or more updates by a service provider.

14. The wireless device of claim 9 wherein the instructions configure the processor to, until said wireless device is provisioned for said services, restrict the wireless device from communicating via the wireless communication network other than for provisioning said services.

15. The wireless device of claim 9 wherein the instructions configure the processor to receive an encryption key in association with said provisioning profile and decrypt and encrypt communications for provisioning the wireless device.

16. The wireless device of claim 9 wherein the instructions are pre-configured to initiate the provisioning of services with a specific service provider.

17. The wireless device of claim 9 wherein the instructions configure the processor to communicate with the service provider provisioning system via a network gateway configured to proxy communications between wireless devices and the service provider provisioning system.

18. A wireless communication network for providing services to wireless devices comprising:

a plurality of wireless devices configured for wireless communication via wireless communication network infrastructure, each wireless device comprising device-side components:

defining an interface for requesting and receiving a provisioning profile via the wireless communication network infrastructure for provisioning services of a service provider, the provisioning profile customized for the device;

defining a run-time environment for generating a customized subscriber interface at the respective wireless devices in accordance with the customized provisioning profile, the customized subscriber interface configured to receive input to generate provisioning information for said services, wherein said input comprises subscriber information and the selection of said services to be provided, the customized subscriber interface further configured to receive modifications to at least some provisioning information to modify the services; and defining an interface for communicating the provisioning information via the wireless communication network infrastructure to a service provider provisioning system for automatically provisioning the services to the wireless device in accordance with the provisioning information and updates to the services in accordance with the provisioning information as modified; and the service provider provisioning system coupled via wireless communication network infrastructure for wireless communication with respective ones of the plurality of wireless devices, the service provider provisioning system comprising server-side components:

defining an interface for receiving respective requests from the wireless devices and providing respective provisioning profiles in response; and defining an interface for receiving respective provisioning information and any modifications to at least some provisioning information from the wireless devices to automatically provision the services and any services as updated to the respective wireless devices.

19. The wireless communication network of claim 18 wherein the service provider provisioning system comprises service provider-side components defining an interface for communicating provisioning session communications to a second service provider provisioning system to provision services of a second service provider.

20. The wireless communication network of claim 18 comprising a provisioning configuration system, said provisioning configuration system defining an interface for defining provisioning profiles and for configuring the service provider provisioning system to provide said provisioning profiles to wireless communication devices.

21. The wireless communication network of claim 18 wherein the service provider provisioning system comprises service provider-side components defining an interface to at least one of a network service control system or billing/ERP system to communicate provisioning information to complete service activation and billing-set up.

22. The wireless communication network of claim 18 further comprising a network gateway system coupled to the wireless communication network infrastructure, said network gateway system configured to proxy communications between said wireless devices and said service provider provisioning system.

23. The wireless communication network of claim 22 wherein the service provider side components defining said interfaces are configured to provide provisioning operations as a Web Service in accordance with Web Service protocols and wherein said network gateway proxies communications to provide said Web Service to the wireless devices.

24. A service provider provisioning system for provisioning services to a plurality of wireless devices for communication via a wireless communication network, said system comprising server-side components:

defining an interface for receiving respective requests from the wireless devices and providing respective dynamically generated provisioning profiles in response, each provisioning profile customized for respective ones of the wireless devices for generating a customized subscriber interface at the respective ones of the wireless devices by a run-time environment, the customized subscriber interface configured to receive input to generate provisioning information with which to define said services, wherein said input comprises subscriber information and the selection of said services to be provided, the customized subscriber interface further configured to receive modifications to at least some provisioning information to modify the services; and defining an interface for receiving respective provisioning information and any modifications to at least some provisioning information from the wireless devices to automatically provision the services and any services as updated to the respective wireless devices.

* * * * *